(12) United States Patent
Mortimer et al.

(10) Patent No.: US 9,092,953 B1
(45) Date of Patent: Jul. 28, 2015

(54) SYSTEM AND METHOD FOR PROVIDING A REMOTE HAPTIC STIMULUS

(71) Applicants: Bruce J. P. Mortimer, Casselberry, FL (US); Scott J. Stickler, Casselberry, FL (US); Gregory R. Mort, Casselberry, FL (US); Gary A. Zets, Casselberry, FL (US)

(72) Inventors: Bruce J. P. Mortimer, Casselberry, FL (US); Scott J. Stickler, Casselberry, FL (US); Gregory R. Mort, Casselberry, FL (US); Gary A. Zets, Casselberry, FL (US)

( * ) Notice: Subject to any disclaimer, the term of this patent is extended or adjusted under 35 U.S.C. 154(b) by 140 days.

(21) Appl. No.: 13/749,466

(22) Filed: Jan. 24, 2013

Related U.S. Application Data

(60) Provisional application No. 61/590,039, filed on Jan. 24, 2012.

(51) Int. Cl.
*H04B 3/36* (2006.01)
*G08B 6/00* (2006.01)

(52) U.S. Cl.
CPC ........................................ *G08B 6/00* (2013.01)

(58) Field of Classification Search
CPC .......................................................... G08B 6/00
USPC ....................................................... 340/407.1
See application file for complete search history.

(56) References Cited

U.S. PATENT DOCUMENTS

| | | | |
|---|---|---|---|
| 1,806,067 A | 5/1931 | Lejeune | |
| 2,543,651 A * | 2/1951 | Weiss | ............... 124/55 |
| 2,628,450 A | 2/1953 | Shelton | |
| 2,846,996 A | 10/1958 | Drynan | |
| 2,855,714 A | 10/1958 | Thomas | |
| 2,879,759 A | 3/1959 | Webb | |
| 3,117,567 A | 1/1964 | Allen | |
| 4,157,703 A | 6/1979 | Brown | |
| 5,823,434 A | 10/1998 | Cooper | |
| 6,213,024 B1 | 4/2001 | Jasper, Jr. | |
| 6,488,270 B2 | 12/2002 | Whiteis | |
| 6,544,347 B2 | 4/2003 | Lucey, Jr. | |
| 7,027,621 B1 * | 4/2006 | Prokoski | ........ 382/118 |
| 7,059,544 B2 | 6/2006 | Leonard | |
| 7,191,774 B2 | 3/2007 | Thorne | |
| 7,265,658 B2 * | 9/2007 | Hisano | ........... 340/436 |
| 8,242,917 B1 * | 8/2012 | Blinn et al. | ........... 340/589 |
| 2010/0110384 A1 * | 5/2010 | Maekawa | ........ 353/10 |

* cited by examiner

*Primary Examiner* — Kerri McNally
(74) *Attorney, Agent, or Firm* — Larry D. Johnson

(57) ABSTRACT

Systems and methods to provide a remote haptic and vibratory feedback stimulus to the body of a participant that may be remote from an actuator for the generation of vortex rings.

16 Claims, 8 Drawing Sheets

SYSTEM AND METHOD FOR PROVIDING A REMOTE HAPTIC STIMULUS

CROSS REFERENCE TO RELATED APPLICATIONS

The present application claims the benefit of the filing date of U.S. Provisional Patent Application Ser. No. 61/590,039, filed Jan. 24, 2012.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. W900KK-12-C-0035 awarded by the U.S. Army, PEO Stri, Attn: KOP/SAP, 12350 Research Parkway, Orlando, Fla. 32826.

REFERENCE TO A MICROFICHE APPENDIX

Not applicable.

TECHNICAL FIELD

The present invention relates generally to systems and methods for providing a haptic and tactile stimulus to a participant. More specifically, a system and methods are described for providing a haptic and tactile stimulus to a participant who is located within an activity area and is positioned remote from vortex ring actuators. One or more sensors can be used to measure the position and orientation of a participant in said activity area, providing information to an intelligent controller, and used to facilitate appropriate haptic and tactile stimuli to specific areas on the body of the participant.

BACKGROUND INFORMATION AND DISCUSSION OF RELATED ART

The sense of touch forms an intrinsic part of our real world experience and is naturally associated with physical exploration and contact. In many virtual reality (VR) and computer gaming settings, touch provides physical contact and contributes to participant immersion. While most VR and computer gaming applications rely mostly on providing realistic visual imagery, it is well known that our perception and world model is shaped by an integration of visual, auditory and somatosensory stimuli, in an automatic process known as sensory integration. The body is particularly adept at using sensory combinations to "fill in the blanks" where "like" sensory information will direct and reinforce our percept. Additional information may also be obtained from olfaction (smell) and temperature perceptual information. Current state of the art VR and gaming platforms provide a realistic and vivid audio visual experience. However, very few systems are able to provide touch feedback (or for that matter, olfactory and temperature feedback), greatly diminishing the realism of the VR or gaming experience.

Touch is therefore a critical component in human-computer interface as it enables us to perceive the existence of objects and to handle them appropriately. For example, touch feedback during typing is naturally provided by the conventional keyboard mechanism but is absent on most current "solid" touch-screens, making typing more difficult on those devices. In general, this type of force feedback is known as haptics. Most haptics research has focused on force feedback to the hands, especially in tele-robotic (tele-presence) where technology enables interaction with remote objects. Tactile aspects of touch usually refer to vibratory stimuli (from 0 to about 400 Hz). The skin is particularly sensitive to vibrations, especially at frequencies above 150 Hz. Tactile feedback often uses a body-worn spatial array of vibrotactile actuators ("tactors") to provide the wearer with patterns of vibration at particular body (or skin) locations that are representative of information, for example, directional cueing (for navigation) or communication patterns.

The body's response to haptic and tactile stimuli is somewhat complex depending on stimulus characteristics, body location, transducer geometry and a large number of psychophysical factors (see for example, Bolanowski, S., Gescheider, G., Verrillo, R., & Checkosky, C. (1988). Four channels mediate the mechanical aspects of touch. Journal of the Acoustical Society of America, 84(5), 1680-1694). For example, tactile spatial acuity, defined to be the two-point discrimination threshold, depends on the skin classification (smooth—such as the hand—or hairy) and also varies over the body. Typically areas linked to exploration (such as the fingers) are much more sensitive than other areas such as the torso or back. Touch receptors in the skin are sensitive to shear, displacement, temperature, and vibration. Typically combinations of receptors are activated by stimuli and their responses combined to be centrally interpreted, classified and characterized, sometimes in non-obvious ways. For example, simultaneous cold and pressure stimuli can combine to produce the percept of wetness.

There are many situations where haptic and tactile feedback is needed to simulate the environment in VR and gaming systems. For example, haptic and tactile feedback may be useful to simulate virtual explosions for indoor virtual training systems; specifically, the force felt from debris strikes from an IED explosion and/or the force felt by a bullet strike would greatly enhance the realism or "presence" of the virtual training experience. In other gaming examples, multiple participants may interact within a virtual combat game and it is desirable to provide tactile feedback to a particular participant who is receiving strikes from bullets, objects and the like.

The theme-park and entertainment industry have a multitude of activities, simulators and rides where haptic and tactile feedback presented to participants would greatly enhance the effect and realism of said activities, thereby enhancing the guest experience.

Many of these applications ideally require that the haptic stimulus be administered remotely to a participant, without additional worn components. Therefore, there is an unmet need for the presentation of haptic and tactile feedback stimuli on one or more participants who are not in direct contact with any objects (such as actuators, force feedback devices and the like) and who are naturally interacting and potentially moving within an activity area. It is also known that haptic stimuli must be provided with precise temporal and spatial characteristics that mimic real haptic and tactile cues and events. Further, this must be done in a safe and effective manner.

Several prior-art actuator technologies have been suggested for use in remote haptic systems. These include air jets, fans, air cannons, wearable actuators (Lindeman, R, Yanagida, Y., Noma, H., Hosaka, K, Wearable Vibrotactile Systems for Virtual Contact and Information Display, Special Issue on Haptic Interfaces and Applications, Virtual Reality, 9(2-3), 2006, pp. 203-213 Vibrotactile Feedback for Handling Virtual Contact in Immersive Virtual Environments," Lindeman, R. W. and Templeman, J. N., Usability Evaluation and Interface Design: Cognitive Engineering, Intelligent Agents and Virtual Reality, Smith, M. J., Salvendy, G., Harris, D., and Koubek, R. J. (Eds.), Lawrence Erlbaum Associates, Mahwah, N.J., 2001, pp. 21-25.) and ultrasonic radiation force. Air jets are simple but are limited in range due to inherent jet turbulence and aerodynamic drag. The use of ultrasonic radiation force in a haptic system is an intriguing technology that has been successfully demonstrated in remote tactile displays. Dalecki et al. (Dalecki D, Child S Z, Raeman C H, Carstensen E L. Tactile perception of ultrasound. J Acoust Soc Am. 1995; 97(5 Pt 1):3165-70) showed that radiation pressure (in liquids) can provide sufficient force to produce tactile sensory effects. Further research (Masafumi Takahashi, Hiroyuki Shinoda, Large Aperture Airborne Ultrasound Tactile Display Using Distributed Array Units, SICE Annual Conference Taiwan, 2010) used a focused array in air to provide vibrotactile stimuli on the outstretched hand of a participant. However, the system produces extremely low actuation forces at the skin surface and is therefore limited in range and capability. Only $1.6 \times 10^{-2}$ N force has been reported (Takayuki Hoshi, Masafumi Takahashi, Takayuki Iwamoto, and Hiroyuki Shinoda, Noncontact Tactile Display Based on Radiation Pressure of Airborne Ultrasound, IEEE TRANSACTIONS ON HAPTICS, Vol. 3, No. 3, 2010). Therefore ultrasonic non-contact display systems modulate (Takayuki Hoshi, Daisu Abe, and Hiroyuki Shinoda, Adding Tactile Reaction to Hologram, The 18th IEEE International Symposium on Robot and Human Interactive Communication Toyama, Japan, Sep. 27-Oct. 2, 2009) the applied force to produce a vibrotactile stimulus (at 200 Hz, the most sensitive frequency for human skin on the palm). The effective range of this device is limited to about 20 cm² area and 40 cm height. Extending the range of this technology is technically challenging; safety concerns limit the energy density (at the skin) to less than 100 mW/cm² which corresponds to a maximum acoustic radiation pressure of about $6.0 \times 10^{-1}$ N on the surface of the skin Ultrasonic arrays operating in air are also inefficient (absorption and coupling limit range) and costly. Further, previous systems have relied on focusing to achieve sufficient radiation pressures, which limits the effective sensory spatial area to a very narrow region. So, while theoretically possible, there are many practical barriers to the implementation of ultrasonic radiation technologies into a larger scale (and range) VR haptic system.

Therefore new approaches are needed for the generation of remote haptic and tactile stimuli.

The foregoing discussion reflects the current state of the art of which the present inventor is aware. Reference to, and discussion of, this information is intended to aid in discharging Applicant's acknowledged duty of candor in disclosing information that may be relevant to the examination of claims to the present invention. However, it is respectfully submitted that none of the above-indicated information discloses, teaches, suggests, shows, or otherwise renders obvious, either singly or when considered in combination, the invention described and claimed herein.

SUMMARY OF THE INVENTION

The present invention relates generally to systems and methods for providing a remote haptic and vibratory feedback stimulus to the body of a participant that may be remote from the actuator. This invention discloses the use of an actuator for the generation of vortex rings as a means for directing and producing a remote haptic and tactile feedback stimulus. Current virtual reality simulators and computer gaming systems do not provide adequate touch feedback. This invention provides a system and method for real-time delivery of touch feedback to virtual reality, simulator training, game participants and the like. There are also a multitude of other commercial applications where remote haptic displays would be beneficial including; computer and console gaming, theme park entertainment, driver alert, safety zone warnings, security systems, medical, advertising and communication.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Vortex rings are common flow phenomena and may be generated by the transient ejection of a jet from a tube or orifice. Although the fluid dynamics associated with vortex flow is rather complex, the vortex itself is mostly laminar in rotation and thus propagates over significant distances without dissipation. This unique property distinguishes vortex rings from conventional jets which expand and dissipate rapidly.

Vortex rings can be generated by the motion of a piston or membrane, or the expansion of a fluid (or gas), thereby pushing a column of fluid in a cylinder through an orifice (or nozzle) as shown in the process depicted in FIG. 1 (see for example, Shariff, K. and Leonard, A. 1992 Vortex Rings. Ann Rev. Fluid Mech. 24, 235-279). The boundary layer at the edge of the orifice or nozzle will separate and roll up into a vortex ring 15. The vortex ring has an induction velocity causing it to accelerate while the vortex ring grows. This combination of vortex ring enlargement and acceleration continues until the shear layer is unable to inject any more voracity to the leading vortex ring. In this case the leading vortex ring is detached from the vortex sheet and the remaining vortex sheet becomes unstable and forms a trailing vortex ring. Thus, the vortex forms a toroidal ring that propagates downstream under its own self-induced velocity in accordance with Helmholtz laws of vortex motion (see for example, P. S. Krueger, A. A. Moslemi, J. T. Nichols, I. K. Bartol, and W. J. Stewart, "Vortex Rings in Bio-inspired and Biological Jet Propulsion," Advances in Science and Technology, pp. 237-246, Vol. 58, 2008). Vortex rings have a relatively simple and persistent three-dimensional structure and, at high Reynolds numbers, they decay slowly.

Vortex rings are used by squid and jellyfish in their locomotion, are well known in science demonstrations and have been investigated by the military for use as a non-lethal weapon (U.S. Pat. No. 6,213,024). Previous military efforts focused on methods to propagate chemical agents (U.S. Pat. No. 6,544,347 B2) by entrapping chemicals within the vortex wave packet and dispensing them during direct impact with the target. Other prior-art efforts have used vortex rings as a novelty toy (see for example U.S. Pat. No. 1,806,067, U.S. Pat. No. 2,879,759, U.S. Pat. No. 4,157,703, U.S. Pat. No. 2,846,996, U.S. Pat. No. 7,191,774), to produce "smoke rings" from a toy gun (U.S. Pat. No. 2,628,450, U.S. Pat. No. 2,855,714, U.S. Pat. No. 3,117,567), to remove surface deposits from a surface (U.S. Pat. No. 6,544,347), dispense aerosols (U.S. Pat. No. 5,823,434, U.S. Pat. No. 7,059,544) or a gas ring vortex in a liquid (U.S. Pat. No. 6,488,270).

Figure 1A:
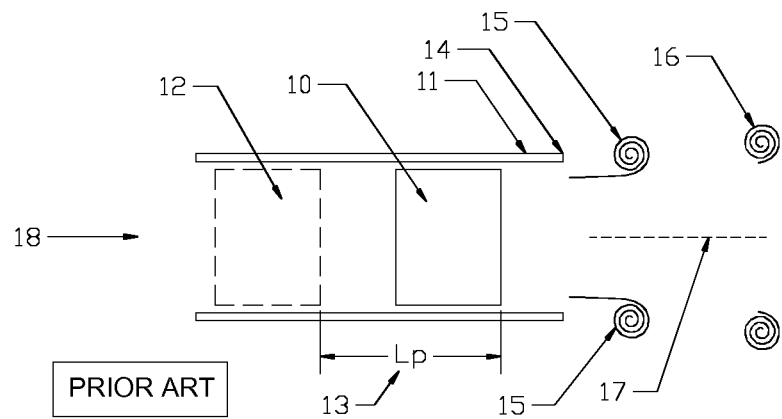
FIGS. 1A-1D illustrate prior-art embodiments of a system for producing a vortex rings.

Prior-art FIGS. 1A-1D show schematics of prior-art components associated with the vortex ring formation. FIG. 1A shows a cross section view of a vortex actuator configuration 18 that comprises of a piston 10 in a cylinder 11 that is moved from an initial position 12 through length 13 to accelerate a mass of air from the cylinder exit 14. The mass of air is initially contained in the cylinder 11 ahead of the piston initial position 12 and is accelerated into a transient air jet by the motion of the piston 10. The air jet mass accelerated through the exit 14 of the cylinder 11 separates and forms an annular vortex ring 15. The vortex ring 15 itself has an internal structure that is laminar and relatively stable, "trapping" part of the jet energy within its rotating structure and propagating with a translational velocity along the axis of the cylinder 17. At a later time the vortex ring will propagate at said translational velocity to a new (downstream) location 16. The center of the vortex ring 15 generally coincides with the axis of the cylinder 17, therefore this axis if often used to "aim" or align the vortex actuator with an intended target.

Figure 1B:
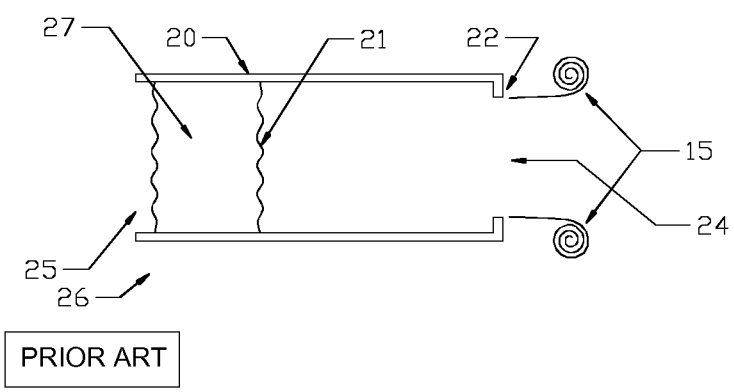

Many different actuation technologies can be used to create jet flow, flow separation and vortex ring creation; for example explosive sources, flammable gasses, elastic membranes or moving pistons actuated by pneumatic, mechanical (elastic, springs, impact), chemical, or electromechanical drivers. FIG. 1B shows another cross section schematic 26 view for the general production of a vortex ring 15. A volume of air 27 (defined as the volume of air accelerated between an initial pressure wave front 21 and a trailing front 25) is accelerated using one of the said actuation technologies, propagating within a structure with walls 20 and impinging on an exit ring orifice 22 to produce a vortex ring 15 with an axis of symmetry 24. A particular problem with prior-art actuation approaches is that they are not well suited to the repetitive generation of multiple vortex rings.

Figure 1C:
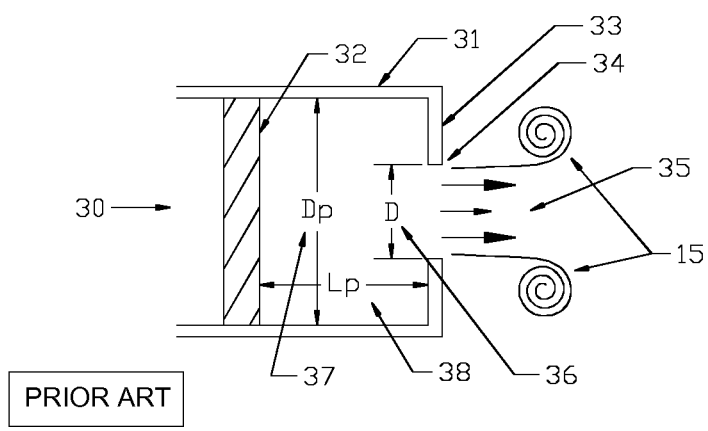

Referring now to FIG. 1C, the propagation velocity of the vortex 15 is primarily linked to the initial jet exit velocity Uj 35. This jet exit velocity 36 is generated through the acceleration of piston 32 (due to actuation force 30) that results in air flow within the actuator cylinder 31. The air flow impinges against and end wall 33 with a nozzle exit 34 orifice diameter that may be smaller than the actuator cylinder 31 diameter. Therefore, particular nozzle structures (see for example Krueger, P.S. 2006 Circulation of Vortex Rings Formed from Tube and Orifice Openings. Proc. ASME Fluids Eng. Div. Summer Mtg., Paper No. FEDSM2006-98268.) may be used to increase the flow velocity Uj. The initial vortex actuator cylinder 31 diameter 37 $D_p$ is larger than the nozzle 34 exit diameter 36 (D). If the vortex jet flow is created through the movement of a piston 32 moving at a velocity $U_p$, the corresponding nozzle velocity Uj will be given by the following relationship:

$$U_j(t) = \left(\frac{D_p}{D}\right)^2 U_p(t)$$

The effective length of ejection L is given by:

$$L = \frac{D_p^2 \cdot L_p}{D^2}$$

Where (D) 36 is the nozzle diameter, ($D_p$) 37 is the piston diameter, (Lp) 38 is the piston stroke.

An important consideration in vortex ring generation is to determine how much circulation and energy can be delivered to the vortex ring by the apparatus. Experiments have shown that for large piston stroke to diameter ratios, L/D, the generated flow field consists of a leading vortex ring followed by a trailing jet. The leading vortex ring is disconnected from that of the trailing jet at a critical value of L/D (called the "formation number"). At the ideal formation number, the vortex ring attains a maximum circulation. The ideal formation number was found experimentally and theoretically to be in the range 3.6 to 4.5. Operating with L/D geometries greater than the ideal formation number leads to excess jet energy resulting in trailing flow (or multiple vortices). Operating with L/D geometries less than the ideal formation number leads to incomplete ring formation. Therefore, the maximum system efficiency is for geometries that are close to the ideal formation number.

The Reynolds number of the jet is given by:

$$R = \frac{\rho \cdot Uj \cdot D}{\mu}$$

Where Uj is the ejection velocity (measured with a high speed camera) and is the dynamic viscosity. For vortex ring creation, the Reynolds number of the circulation Rg must be greater than $10^4$ and is given by:

$$Rg = \frac{L}{2 \cdot D} \cdot R$$

The vortex ring propagation velocity is approximately given by:

$$W = \frac{1}{2} \cdot Uj$$

The approximate radius of the vortex ring is then given by the empirical relationship:

$$Radv = \frac{1 \cdot 2D}{2}$$

Figure 1D:
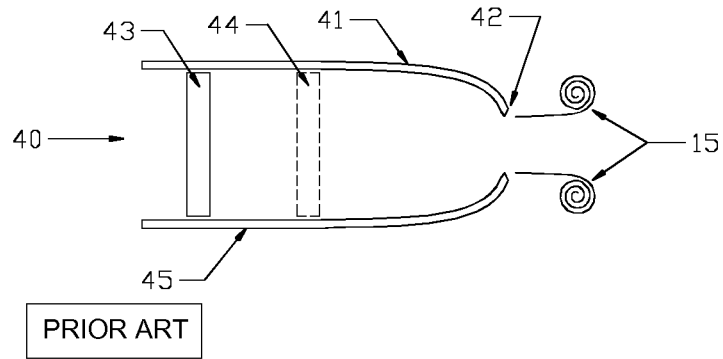

The formation of the vortex may be further optimized using the shaped nozzle shown in FIG. 1D. In this vortex actuator example 40, the cylinder 45 containing a piston or membrane 43 that moves from an initial position to a final position 44, accelerating a volume of air (or fluid) through a convergent (tapered) nozzle 41 to an exit 42 to produce a vortex ring 15. The shape of the convergent nozzle 41 may be designed using fluid mechanic principles, well known in the art, to maximize the flow velocity at the nozzle exit 42 and ensure laminar flow conditions (up to the nozzle exit 42).

The vortex ring has circulatory rotational energy as well as momentum from the mass of the vortex and its propagation velocity. Unlike air jets, the vortex rotation preserves the impulse energy and remains stable, propagating for considerable distances (up to several 100 ft in special conditions). There are several factors that influence the propagation of the vortex ring. It is known that to impart high energy into the vortices (and have a high vortex propagation velocity), the initial jet velocity should be as high as possible. However, in compressible flow, the flow will rapidly become non-linear and areas of supersonic flow (and the associated shock wave phenomena) will occur and "choke" the nozzle. Different size vortices can be created with nozzle exit diameters. However, it is known that the maximum efficiency is for L/D close to the ideal formation number (see for example, P. F. Linden, J. S. Turner, The formation of 'optimal' vortex rings, and the efficiency of propulsion devices, J. Fluid Mech. (2001), vol. 427, pp. 61-72). Therefore if the length L is varied, the aperture D must change to preserve this optimum ratio.

In this invention, one or more vortex rings are generated using one or more vortex actuators and propagate towards and impinge against the body surface of one or more participants, thereby providing a haptic and tactile stimulus to said participants. More specifically, we disclose a system and method for providing a haptic and tactile feedback stimulus to a participant who is located within a specified activity area and is not in physical contact with said vortex ring actuators. As the vortex encounters an object (such as a person in the path of the vortex) some of the energy in the vortex will be converted to thrust against the surface of the object. Sufficient thrust forces against a participant body surface will create shear and deflection in the cutaneous layers (skin) that will activate various touch receptors, thereby producing detectable and identifiable haptic and tactile stimuli. Layers of participant worn clothing may act to absorb vortex thrust forces and reduce said stimuli. Therefore, vortexes intended to produce haptic and tactile effects should be generated with high energy.

Figure 2A:
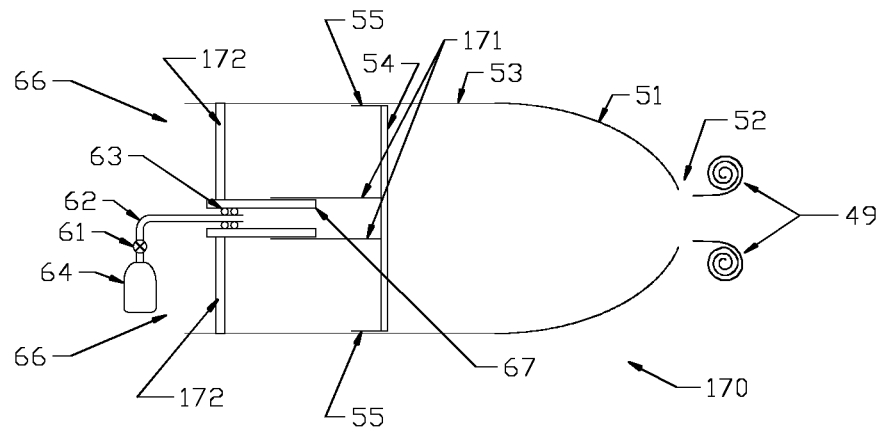
FIGS. 2A-2C illustrate aspects and embodiments of an actuator driver for producing vortex rings with enhanced characteristics.
Figure 2B:
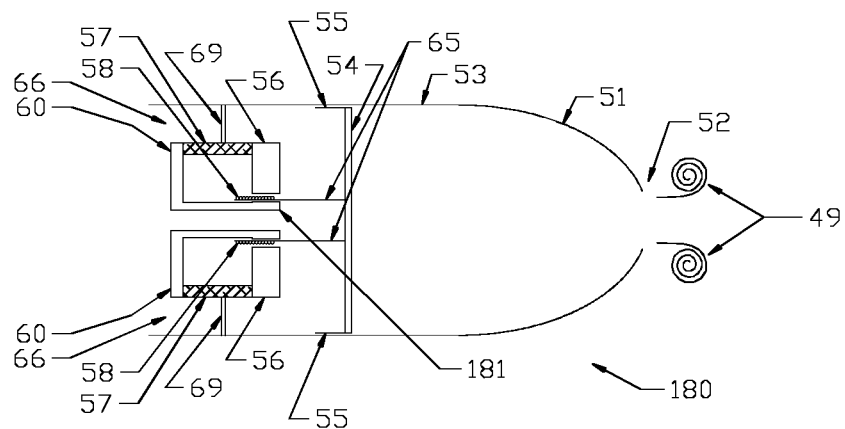
Figure 2C:
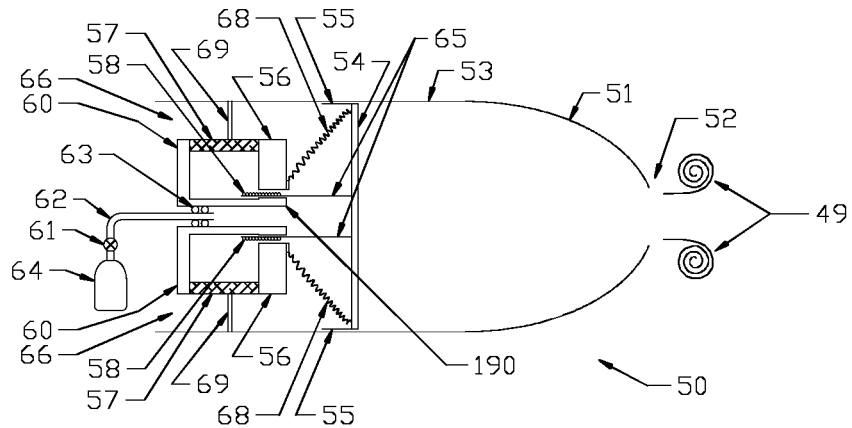

FIGS. 2A-2C show various embodiments of this invention describing aspects of actuators with enhanced characteristics for generating high energy vortex rings 49.

FIG. 2A shows a sectional view of an enhanced vortex actuator 170 comprising of a high energy pneumatic source 64 for imparting energy to the piston 54 within a cylinder 53 with an optional shaped nozzle 51 and exit aperture 52. Suitable pneumatic energy sources are compressed gasses such as air, $CO_2$, $N_2$ and the like, which are stored in a high pressure tank 64.

A mechanism for pressure regulation well known in the art must be used together with a mechanism 61 for controlling the release of gas such as a valve. For example, a $CO_2$ tank together with a transient mechanical or electro-mechanical valve (termed a poppet) may be used to provide a pulse of high pressure gas that will rapidly expand in a chamber 62. The rear 66 of the actuator assembly is preferably left predominantly open so as to not restrict the motion of piston 54. The chamber 62, in one embodiment of this invention, is connected to an expansion chamber 67 that is surrounded by a barrel cylinder 171 making up a pneumatic actuator. The connection between said chamber 62 and said expansion chamber 67, may be a high pressure coupling or seal 63, for example an o-ring. The coupling or seal 63 provides an airtight connection between said chamber elements. The barrel cylinder 171 is connected to the rear of the piston 54 and is free to slide with respect to the expansion chamber 67. The expansion chamber 67 is rigidly mounted against the actuator cylinder 53 using mounts 172. Therefore said gas expansion in expansion chamber 67 will act to increase the pressure in the barrel cylinder 171 and slide the barrel cylinder (and the adjacent piston 54) with respect to the expansion chamber 67, accelerating said piston and displacing a volume of air through the nozzle 51 and exit 52 to produce a high energy vortex ring 49.

In one alternate embodiment, the barrel cylinder 171 may be designed to fit and slide with respect to the inner surface of the expansion chamber 67. In another alternative embodiment, the barrel cylinder 171 internal expansion volume may be preferably decreased by filling a portion of said volume with a light weight material (such as foam) or alternately designing an additional plenum in said internal volume to decrease said volume. In yet another embodiment, the expansion chamber 67 may be constructed with a larger diameter and seal against the internal diameter of cylinder 53. In this implementation, barrel cylinder 171 and mounts 172 may be omitted and the piston 54 is directly acted upon by said gas expansion.

For example, one exemplary implementation of may use a high pressure tank 64 containing liquid $CO_2$ at approximately 700 psi. The piston 54 diameter is 9 inches with a throw of 5.3 inches and an exit diameter of 4.7 inches. Typical measured vortex pressure rise times are less than 10 ms, measured vortex translational velocities are between 15 and 30 m/s and measured force impinging on disk target (5 inch diameter) 6 ft away from the actuator is approximately 1.2 lbs. Thus similar vortex rings impinging on participants will be perceived as a highly salient (noticeable) tactile and haptic effect.

The sectional view of FIG. 2B shows an embodiment of vortex actuator design 180 comprising of a moving coil energy source driving a lightweight piston 54 within a cylinder 53 with an optional shaped nozzle 51 and exit aperture 52. Moving coil windings 58 are affixed to a light weight bobbin former 65 and are also rigidly attached to the light weight piston 54. The elongated coils 58 are separated with a small air gap from a magnetic pole piece 56 and another center pole piece 181. The magnetic pole piece 56 is in turn coupled to a high field strength permanent magnet ring 57, and rear pole piece 60 and center pole piece 181 to make up a static magnetic circuit that is rigidly attached to the cylinder 53 using mounts 69. Electrical current through the elongated coils 58 will produce a magnetic field that will interact with the magnetic circuit determined by pole pieces 56, 60, 181 and the magnet 57 according to well known laws of electromagnetic motor interaction. If the direction of the coil current (as determined by the applied voltage polarity) is selected such that the electromotive forces acting on the coil act to translate the piston 54 (with respect to the cylinder 53 walls) towards the nozzle exit 52, a volume of air will be accelerated by the piston 54 and produce airflow through the nozzle exit and produce a high energy vortex ring 49.

Optional piston extensions 55 protrude at least 1 cm back from the piston 54 face and are in close proximity to the cylinder wall 53, thereby making a low friction air seal around the piston 54. Alternately, other suspension means such as linear bearings and multiple compliant attachments may be used for co-locating the moving coil windings 58 within said air gap and collocating the piston 54 within cylinder 53.

The sectional view of FIG. 2C shows a hybrid vortex actuator design 50 comprising of a moving coil energy source in combination with a high energy pneumatic source 64 (pneumatic actuator arrangement) as an additional mechanism for imparting energy for driving a lightweight piston 54 within a cylinder 53 with an optional shaped nozzle 51 and exit aperture 52.

The combinational design shares many features component features as described hereinbefore. The features of the center pole piece and expansion chamber may be advantageously combined into a single combinational part 190. Similarly, the features of the moving coil bobbin former may be advantageously combined with the features of the barrel cylinder in a single combinational part 65.

Therefore, under the action of one or both said energy sources, the piston 54 will be accelerated, displacing a volume of air through the nozzle 51 exit 52 to produce a high energy vortex ring 49. In alternate embodiments, the combination of said pneumatic and electromagnetic forces may be staggered in onset; for example, initially accelerating the piston under the action of the moving coil energy source and advancing said acceleration by combining said pneumatic source at a later time.

Moving coil piston transducers are widely used in acoustics (loudspeakers and wide bandwidth sonar transducers). Moving coil actuators are linear, easy to drive with audio amplifiers, capable of repetitive pulsed operation and fit the form factor required for the vortex ring actuator. The inertia of the piston 54 is usually difficult to accelerate so lightweight rigid materials must be used. Further, it is difficult to simultaneously meet large diameters and stroke lengths; the piston must be carefully suspended within a tube, with minimal lateral leak paths, yet ideally be frictionless. Previous approaches have attempted to use linear bearings as a guide for the piston and coil as well as advanced magnetic circuit configurations that allow the coil to be in an optimum magnetic field over a long stroke.

Figure 3:
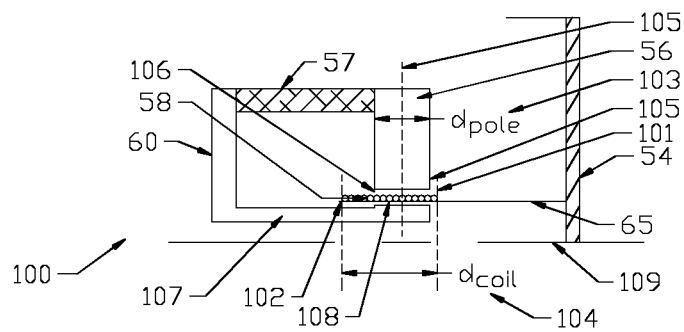
FIG. 3 illustrates aspects of a magnetic circuit and unidirectional moving coil assembly.

Moving coils such as those used in loudspeaker actuators are also designed for bidirectional linear performance creating equal positive and negative piston displacements. However, vortex actuator driver requirements need only be unidirectional. FIG. 3 shows details of a sectional view of an enhanced unidirectional moving coil 100 assembly in accordance with an embodiment of this invention.

The moving coil 58 is mounted on a light weight former 65 rigidly connected to the piston 54. The elongated coils 58 are separated with a small air gap 106 from a magnetic pole piece 56 that is in turn coupled to a high field strength permanent magnet ring 57, and rear pole piece 60. The rear pole piece connects to a center pole piece 107 that is separated from the rear of the elongated coils 58 and former 65 with another small air gap 108. The moving coil therefore moves between magnetic pole piece 56 and rear pole piece 60. The moving coil 58 is wound with an elongated coil height ($d_{coil}$) 104 that is and at least 1.5 times greater than the pole piece 56 width ($d_{pole}$) 103. The initial position of the piston 54 and moving coil is such that the end of the moving coil 101 is located close to the edge 105 of pole piece 56. A portion of the moving coil 58 therefore, in its initial position, initially protrudes outside the magnetic circuit. More specifically, the end 102 of the moving coil 58 is initially outside said air gaps 106 and 108. Center axis 109 is also the axis of symmetry for device and sectional view 100. However, as the piston and moving coil assembly is displaced (during operation), the center 105 of the pole piece section 56 will then cover another region of the coil 58. Therefore a portion of the coil is located between pole piece 56 and the center pole piece 107 over the complete operational movement of the piston 54 (as described hereinbefore). This invention facilitates unidirectional operation over a larger range (or throw) as the moving coil is initially biased with the coil edge at the magnetic circuit center and subsequent motion will move the moving coil through a larger displacement (for a given moving coil height).

An optional spring (compliance) 68 is attached to the rear of the piston 54 and the magnetic circuit assembly. Therefore the spring 68 extends as the piston travels down the cylinder 53 and will provide a restoring force to return the piston to its start position.

Figure 4A:
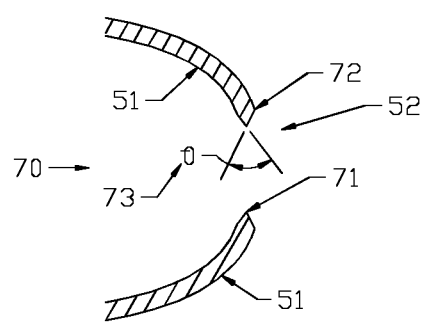
FIGS. 4A-4C illustrate aspects and embodiments of new nozzles for generating vortex rings with enhanced characteristics.
Figure 4B:
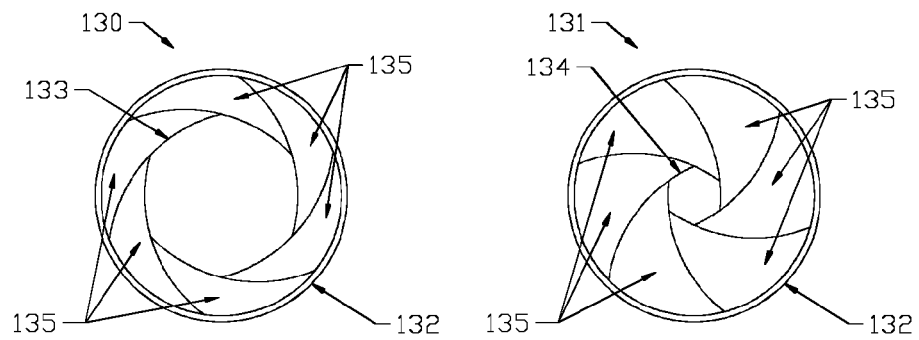
Figure 4C:
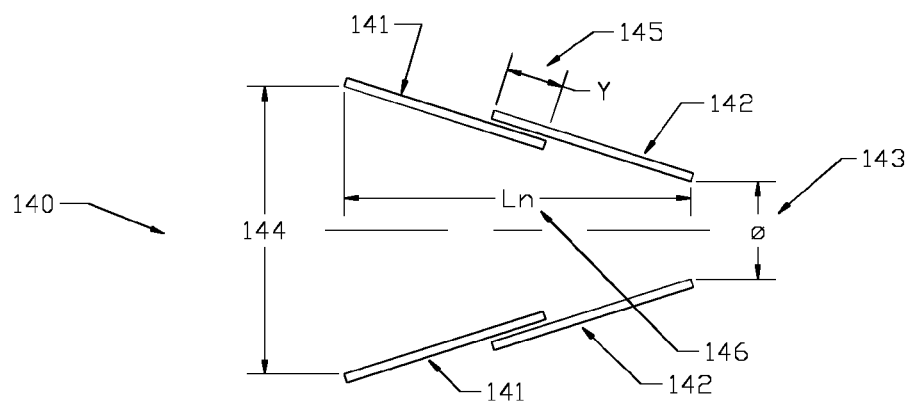

FIGS. 4A-4C show various details and embodiments of this invention. FIG. 4A shows a sectional detailed view 70 of the exit aperture of the nozzle 51. The exit aperture edge 71 should preferably have a straight portion 72 such that the angle 73 between said portion 72 and the edge 71 is less than 45 degrees. Further, the edge 71 should be smooth and symmetric (circle) so that optimum symmetric flow separation can occur at the nozzle exit, thereby enhancing the vortex ring formation.

FIG. 4B shows two views of another embodiment of this invention. 130 and 131 show a variable diameter exit aperture for use in an enhanced, configurable vortex ring actuator. FIG. 4B shows the variable diameter exit aperture configured for two different inner diameters. The variable diameter exit aperture comprises of an iris diaphragm containing an outer ring 132 and a number of adjustable curved elements 135. The iris diaphragm mechanism is well known in prior-art camera and optic systems. Four to twenty four elements 135 are usually used in the iris diaphragm, each element 135 being movable, and curved to improve the roundness of the opening (133 and 134). The elements 135 are attached to a mechanism and moved in unison typically by rotating an element actuation ring connected to said elements. Said rotation moves each elements thereby changing the segment angle and position as is well known in the art. Therefore, this variable diameter exit mechanism provides a means for adjusting or configuring the nozzle exit diameter. For example, a configurable vortex ring actuator may be set from a larger opening 133 to a smaller opening 134 (changing vortex characteristics as described hereinbefore). The adjustment may also be easily motorized using electric stepper motors, actuators and the like, and controlled during operation.

FIG. 4C shows a section view 140 of another embodiment of this invention comprising of two or more conical, adjustable nozzle sections 141 and 142. A first conical section 142 has a smaller diameter 143 at one end. A second conical section 141 overlaps 145 the first section 142 at one end and has a final diameter 144 at the other end. The conical sections make up a nozzle assembly with a length 146. Additional conical elements (not shown) may also be optionally added to the assembly. Actuators (such as linear motors, stepper motors) adjust the length of overlap 145 on each assembly, thereby changing the overall nozzle length 146.

The conical nozzle sections must fit closely together to prevent any pressure pulse leakage. Combining an iris diaphragm (described hereinbefore) mechanism to the nozzle conical section 141 may be used to adjust the diameter of the overlapping section. An iris mechanism combined in conical section 142 would further allow the simultaneous adjustment of the exit aperture diameter. Other mechanisms such as flexible seals may also be used to couple adjacent conical sections during nozzle length adjustment. In another implementation, the conical sections may be cylindrical, simply sliding over adjacent sections (telescoping).

These features (nozzle diameter and nozzle length adjustment), used in combination with one of the vortex actuators described hereinbefore, allows for real-time adjustment of the nozzle exit diameter and the features of the vortex ring. Therefore these features provide a variable length nozzle for use in an enhanced configurable vortex ring actuator. A particular advantage of this feature is that we are able to shape the vortex by controlling the piston velocity and L/D ratio dynamically. Various piston velocity profiles can by altering the pneumatic and/or moving coil driver actuation forces (with or without constant L/D) to achieve various vortex characteristics and sensory effects.

Figure 5:
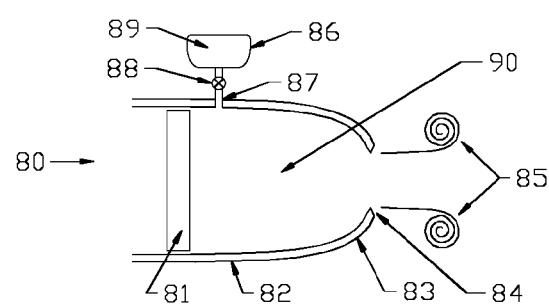
FIG. 5 illustrates aspects of an embodiment for generating vortex rings with enhanced characteristics.

FIG. 5 shows a sectional view 80 of another embodiment of this invention for creating a vortex generator with enhanced characteristics. An inlet 87 is connected to the vortex ring actuator nozzle 82. Prior to actuating the piston or membrane 81 using any of the methods described hereinbefore, a controllable valve 88 can be switched such that material 89 within a storage tank 86 can be used to fill the nozzle volume with a concentration of material 89. Additional fans, compressors and atomizers can be used to achieve the material transfer. Material 89 may be a gas, aerosol and may be a material held at a different temperature to ambient. As the piston or membrane 81 is actuated, a portion of the contents of the nozzle 90 (containing a concentration of material 89) will be accelerated and flow through the exit 84 producing a "seeded" vortex ring 85 that will entrap a concentration of material 89. Optional shaped nozzle 83 may be used to maximize the flow velocity at the nozzle exit 84 and ensure laminar flow conditions.

For example, an aerosol smoke may be generated (using methods and products well known in the art), fill the nozzle 90 and produce visible "seeded" vortex rings for enhanced simulator effects. In other examples, scents and odors may be added using atomization or sprays (well known in prior-art) to fill the nozzle and vortex ring for enhanced effects. Virtual reality (VR) training, games and the like seldom use olfaction, however the presence (or realism) of said VR is greatly enhanced with additional sensory feedback, For example, simulating firefighter exercises may be enhanced through the use of smells associated with fires.

In other embodiments, multiple types of effects may be created by additional controllable and selectable mechanisms that "seed" various kinds of odors that will be associated with different scenarios in a VR environment. Similarly, the illusion of moisture may be created through the combination of a low temperature gas "seeded" in the vortex ring and the pressure associated with the vortex ring impinging on a participant. These illusions can be used to enhance the realism of virtual training systems, gaming and amusement park rides.

Another embodiment fills the nozzle cavity with various different gases such as helium. Helium has a sound speed that is three times greater than air. Therefore, much higher jet exit velocities (and thus creating higher energy vortex rings) are potentially achievable (without the non-linear effects of supersonic flow).

Figure 6:
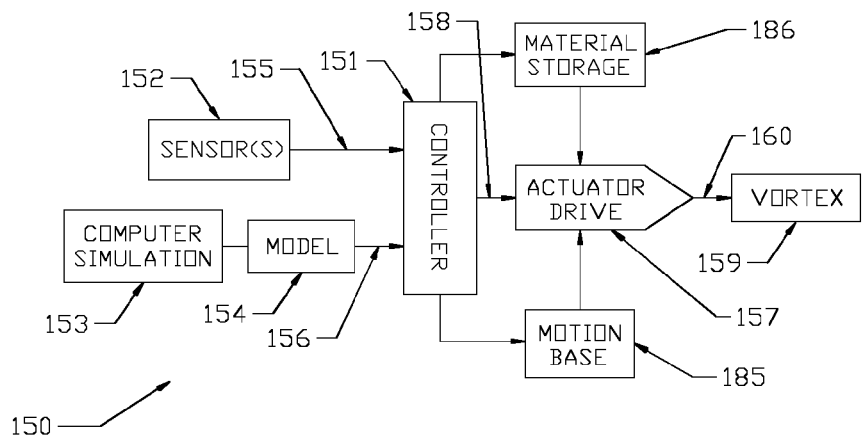
FIG. 6 illustrates a block diagram for a system for providing a remote haptic and tactile feedback cue.

FIG. 6 shows a block diagram 150 illustrating remote feedback aspects of this invention. A controller 151 receives and interprets participant positional and activity state information from a group comprising of one or more sensors 152, and/or a computer simulation 153. Sensors 152 may generally determine the location of one or more participants as described hereinafter. The computer simulation 153 is typically virtual reality training or gaming software in which the participant (or multiple participants) interacts with virtual scenarios according to methodology well known in the art, with said scenarios creating events having associated haptic and tactile interactions that are determined by a model 154. The controller 151 produces one or more activating signals 158 to one or more actuator drive units 157 to produce one or more vortex rings 159. Said vortex rings 159 are produced using fluid flow and flow separation mechanisms 160 as described hereinbefore. The controller may, in some embodiments, produce one or more activating signals to one or more motion base 185 vortex actuator positioning (aiming) systems as described hereinafter. The controller may also, in some embodiments, produce one or more activating signals to one or more vortex actuators such to control the material 186 in the vortex (seeded vortex rings) as described hereinbefore. Vortex rings 159 are then directed at one or more participants, where they impinge on the body surface and produce various tactile and haptic sensory feedback effects in said participants.

In a first example illustrating further aspects of this invention, a military combat computer simulation 153 is designed to represent combat scenarios including situations in which the participant may be exposed to "virtual" strikes from objects and explosions. It is the goal of this invention to represent these "virtual" strikes and features, using remote haptic and tactile cues using one or more vortex rings impinging on said subject. Sensors may determine the location of one or more participants and transmit this positional information 155 to the controller 151. The controller 151 may use said participant positional information to configure motion base actuators to align one or more vortex actuators such that they are aligned (aimed) at one or more participants (or aligned to aim at specific areas of said participants, for example, their faces, legs, arms, hands, torso, backs or chests). The computer simulation 153 defines the virtual events and activities, and uses a model 154 to determine the type, location, and stimuli parameters that must be associated with the haptic and tactile virtual events. Therefore, the model may be an integral part of the computer simulation 153 software code and physics engine, or separate using the auditory and visual outputs of the simulator together with a classifier to recognize and identify "virtual" events. Haptic and tactile virtual event information 156 is transmitted to the controller 151. The controller 151 processes the tactile virtual events and configures and triggers one or more vortex actuators to produce one or more vortex rings 159 that are directed at one or more participants, where they impinge on the body surface and produce various tactile and haptic sensory feedback effects in said participants.

In a second example illustrating further aspects of this invention, remote haptic and tactile feedback is provided to one or more participants based on their position or orientation. One or more sensors, or groups of sensors, determine the location and orientation of said participants, and transmit this data 155 to a controller 151. The controller determines whether a predetermined sensor limit or predetermined threshold (corresponding participant position or orientation) is met. If the said thresholds are met, the controller 151, produces one or more activating signals 158 to one or more actuator drive units 157 to produce one or more vortex rings 159. Vortex rings 159 are then directed at one or more participants, where they impinge on the body surface and produce tactile and haptic sensory effects in said participants. The controller 151 may use said participant positional information to configure motion base actuators to align one or more vortex actuators such that they are aligned (aimed) at one or more participants (or aligned to aim at specific areas of said participants, for example, their faces, legs, arms, hands, torso, backs or chests). In other embodiments, the controller 151 may use the participant positional information and an array of vortex actuators positioned around the participant, to provide said participant with directional feedback i.e. vortex ring feedback from a positional location corresponding to the controller 151 detected positional threshold that has been reached by said participant.

Figure 7:
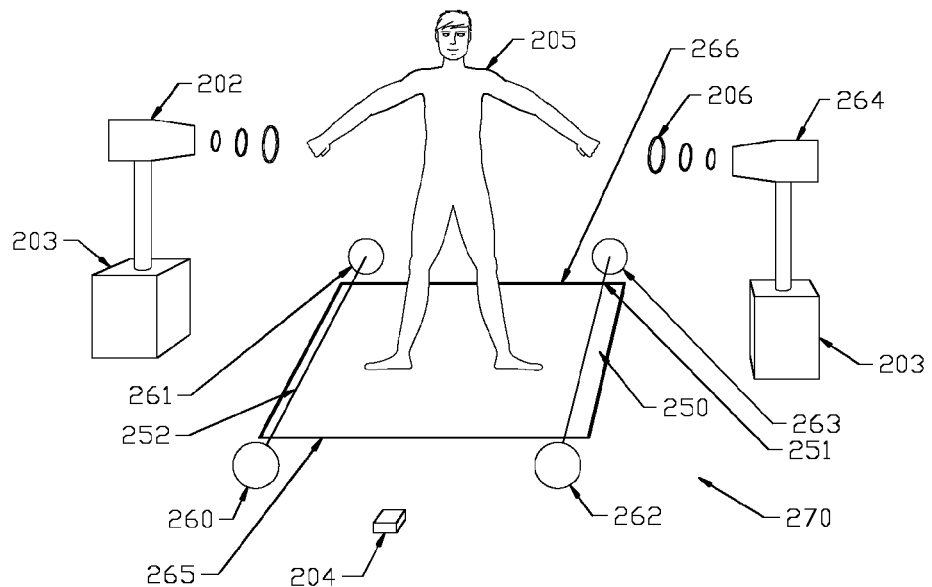
FIG. 7 illustrates an embodiment of a system for providing a remote haptic and tactile feedback stimulus based on participant position.

FIG. 7 shows further details of a remote haptic and tactile feedback embodiment 270 of this invention comprising of one or more sensors (for example 260, 261, 262, 263), a controller 204 and a means for providing a remote haptic and tactile stimulus to the participant 205 using one or more vortex ring actuators 202 (and 264). These items communicate with the controller 204 using conventional wired or wireless connections. The participant 205 is located within an assigned activity area 250 and is free to move within said activity area. One or more vortex ring actuators 202 are usually positioned outside the periphery of the activity area 250, and are generally aimed at said participant 205.

One or more sensors (for example 260, 261, 262, 263) measure whether the participant 205 reaches one or more boundaries (for example 252 and 251). If said boundaries are reached, one or more sensor states will change and will be transmitted and interpreted by a controller 204 as described hereinbefore. Said controller 204 interprets the sensor input to determine which boundary (for example 251 or 252) has been reached, and in one embodiment of this invention, what haptic and tactile feedback stimuli should be presented to the participant 205. Therefore, the controller 204 produces one or more activating signals to one or more actuator drive units within one or more vortex actuators 202 (and 264) to produce one or more vortex rings. Vortex rings 206 are generally directed at the participant 205, impinging on a selected area of the participant's 205 body surface, thus producing tactile and haptic sensory effects that are perceived by the participant 205.

In some embodiments, optional motional base 203 may be used to position the vortex actuator 202 (or 264) towards one or more participants. Said motion base 203 technology is well known in the art and for example may comprise of multiple motors and sensor systems, and be controlled by signals from a controller 204. Said signals may manipulate the motion base 203 and attached vortex actuator 202 (or 264) to preferentially orientate the axis of the vortex actuator towards a specific location (for example the head) of a specific participant. Therefore, sensors may be used by the controller 204 to track the position and orientation of the subject 205 in an activity area 250, and manipulate a motion base 203 such that the vortex actuator is preferably aimed at participant 205.

In some embodiments, multiple vortex actuators may be arranged in a linear array. One example may include a line of vortex actuators spaced about 1 ft adjacent from each other and facing the same direction (in parallel). This configuration will ensure that a participant will be covered by at least one vortex actuator, even if no motional bases are used. In other examples, more complex arrays of vortex actuators, together with associated motional bases, may be used to simultaneously cover multiple participants, and/or produce more complex haptic and tactile effects. For example, multiple vortex actuators can produce multiple vortex rings impinging in sequence on a common area of one participant. Therefore, the participant senses multiple impulses (separated by the time interval between vortex rings) which will be perceived as vibration and will be more noticeable (or salient) than individual pulses.

Sensors 260, 261 and 262 and 263 may be optoelectronic beam sensors that are well known in prior-art. In one configuration, beam sensors comprise of a pair of optoelectronic transmitters (such as LED, laser and the like) and receivers (such as photodiodes, phototransistors and the like). Sensor pairs are combined with the transmitter aligned to face a corresponding receiver. The overall state of the sensor changes if the optical beam generated by said transmitter is interrupted. In another configuration, the optoelectronic sensors may comprise of a transmitter and receiver located within the same sensor package. In this case the receiver will detect backscatter from an object in the range of the sensor. More generally, any type of proximity or beam sensor may be substituted if the sensor performance is sufficient for participant detection and virtual boundary state measurement. Therefore, ultrasonic, electrical field, radar, magnetic, inductive, pressure tube, piezoelectric wire and camera sensor technologies may be used in alternate sensor configurations.

For example, the haptic and tactile feedback system 270 may be configured as a remote, directional warning for a participant 205 operating in an activity area 250. If the participant 205 crosses one or more predetermined boundaries (for example 252 or 251), sensors (for example sensors 260 and 261, or 262 and 263 respectively) detect the particular boundary incursion, output an appropriate sensor state and transmit said state using wired or wireless transmission means to a controller 204. Said controller interprets the sensor state, determines which boundary (for example 252 or 251) has been reached, and what tactile and haptic feedback stimuli should be presented to the participant 205. For example if the boundary 252 is crossed, the participant 205 may receive one or more haptic and tactile cues from vortex ring actuator 202. Similarly, if another boundary 251 is crossed, the participant may receive haptic and tactile cues from vortex ring actuator 264. In this example, the vortex ring actuators 202 and 264 have been positioned on the side of the activity area that corresponds with the sensor boundary 252 and 251 (respectively), thus facing the participant 205. Similarly, directional haptic and tactile warning cues may be given by one or more vortex ring actuators positioned corresponding to one or more additional sensor combinations making up one or more additional virtual boundaries. In this example, it may be desirable to make the alarm condition continuous until reset—haptic and tactile cues are presented until the participant either leaves the activity area 250, or returns behind the said predetermined boundaries.

In another example, the haptic and tactile feedback system 270 may be configured for the generation of remote startle responses for enhanced immersive entertainment. In this configuration, if the participant 205 crosses one or more predetermined boundaries (for example 252 or 251), sensors (for example sensors 260 and 261, or 262 and 263 respectively) detect the particular boundary incursion, output an appropriate sensor state and transmit said state using wired or wireless transmission means to a controller 204. Said controller interprets the sensor state, determines which boundary (for example 252 or 251) has been reached, and what tactile and haptic feedback stimuli should be presented to the participant 205. For example, if the boundary 252 is crossed, the participant 205 may receive one or more haptic and tactile cues from vortex ring actuator 202. Similarly, if another boundary 251 is crossed, the participant may receive haptic and tactile cues from vortex ring actuator 264. In this example the vortex ring actuators 202 and 264 have been positioned on the side of the activity area that corresponds with the sensor boundary 252 and 251 (respectively), thus facing the participant 205. In other examples, it may be preferable to arrange the position of one or more vortex ring actuators such that as the participant 205 crosses a boundary, haptic and tactile feedback can be presented from the side or preferably rear of the participant.

It should be evident from the foregoing discussion that certain embodiments of this invention may be implemented with a simple controller (such as a logic switch), or that the controller may be included directly within the sensor or vortex actuator directly.

Although FIG. 7 demonstrates the case for only one participant, it should be clear that this concept may be easily extended to an embodiment comprising of multiple participants 205. Multiple participants can share the same activity area 250 (limited by practical considerations such as the dimensions available). One or more participants may, in some embodiments of this invention, move through the activity area; entering and exiting from one of the activity area sides 265 or 266. Alternatively, participants may move through the activity area in a manner that intentionally crosses a virtual boundary.

Further, multiple activity areas (with associated sensor, boundaries, controller and vortex ring actuators) may be arranged proximally. For example, two or more activity areas may be arranged adjacent to the first with one or more common virtual boundaries, thereby extending the length of said predetermined boundary. In this case, components of the sensors and the intelligent controller may be combined (saving wiring, materials and cost).

In general, the participant's upper limbs and/or torso are the preferred target sites for delivering a haptic and tactile stimulus. Therefore, these sites are typically where any generated vortex, or series of vortexes, is intended to impinge upon and thereby create a stimulus. For example, virtual reality based training systems may use the vortex-generated haptic stimulus to mimic explosions and related effects. In general, the haptic stimulus direction should preferably mimic the orientation of the participant and the virtual threat (in a VR application). Therefore many applications will need at least four actuators surrounding the participant to represent the possible stimulus directions achieve a haptic immersive effect. Thus, haptic directional information must be congruent with information from visual, audition and possibly the known location of a threat. Further, the orientation of the participant may change during many applications. For example, virtual simulations may involve participants who are able to stand, turn and move in limited directions. Therefore, haptic actuators may need to track (and follow) the participant in real time, such that any haptic stimuli produced by the system are correctly oriented with respect to the virtual environment and the instantaneous location and orientation of the participant.

Figure 8:
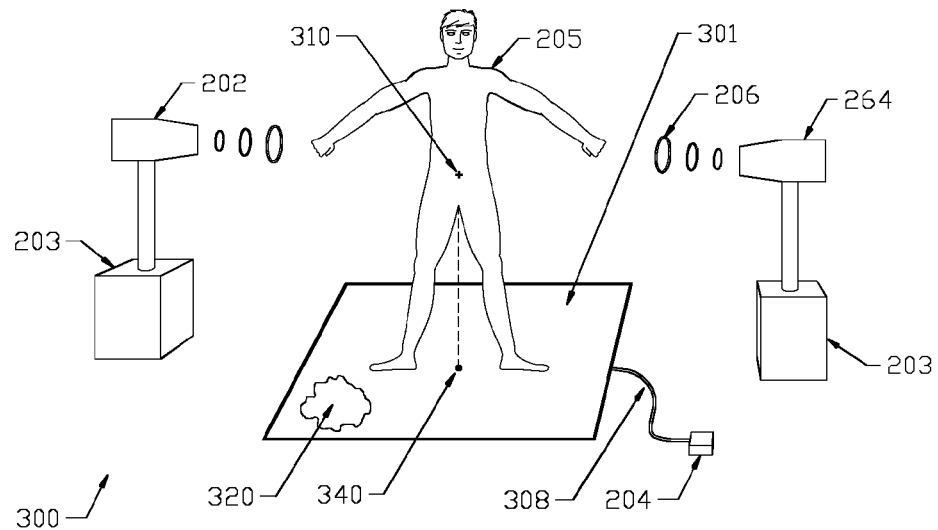
FIG. 8 illustrates another embodiment of a system for providing a remote haptic and tactile feedback stimulus based on an event or participant position.

FIG. 8 illustrates another embodiment 300 of this invention, comprising one or more force plate sensors 301, a controller 204 including means for tracking the position 310 of a participant 205 and a means for providing a remote haptic and tactile stimulus to the participant 205 using one or more vortex ring actuators 202 (and 264). The force plate 301 provides a means for determining the participant 205 location 340 in an activity area by measuring the center of foot pressure (COP) generated by the participant standing on the fixed support surface of the force plate 301. The participant location 340 (COP) measured by the force plate corresponds to the approximate ground projected position 310 of the participant 205. The COP is computed from the signals provided by force transducers which are typically embedded in the corners the force plate 301. In general, a force plate is a sensor that measures the load at discrete points mounted beneath a relatively rigid plate. The load is usually measured using load-cell type sensors, converted into an electronic voltage signal and sampled using an analog to digital converter to be in a form suitable for computer or microcontroller processing. The sensor signals may be transmitted to a controller 204 using analog or digital means well known in the art. For example a cable 308 may connect said controller 204 to the sensors and associated components using USB and the like. In other embodiments, wireless transmission may be used. The response from one or multiple force plates can be combined using known analog to digital and mathematical algorithms implemented in computer software. The load cells and measurement conversion electronics in the embodiment of FIG. 8 may be configured to be accurate for a range of participant weights, for example from approximately 100 to approximately 300 pounds. While this configuration is a typical force plate configuration, it is not to be construed as a limitation on the claims. Any mechanism using means known in the art to provide the above signals is conceived to be within the scope and breadth of the claims herein.

Although the embodiment of FIG. 8 illustrates a single force plate 301, any number or configuration of force plates may be employed to produce an active area that is sufficiently large enough to support the participant 205. For example, the combined area of multiple force plates may be greater than approximately 4 by approximately 4 m.

The controller 204 determines the participant 205 location 310 based on the COP measurement determined by one or more force plates 301. If the participant 205 moves such that the location 310 (as measured by the instantaneous COP) crosses one or more predetermined boundaries (for example the virtual boundaries illustrated by 320), the controller detects the particular boundary incursion, and what tactile and haptic feedback stimuli should be presented to the participant 205. For example if the participant position 310 (as measured by the participant's COP movement) crosses over any point on the example boundary 320, the participant 205 may receive one or more haptic and tactile cues from one or more vortex ring actuators (for example 202 and 264). Similarly, directional haptic and tactile cues may be given by one or more vortex ring actuators positioned corresponding to one or more additional sensor combinations making up one or more additional virtual boundaries.

It should also be evident that haptic and tactile cues can beneficially be linked to direction. For example, if the boundary incursion is in front and to the right of the participant, corresponding directional tactile and haptic cues may be given using one or more vortex actuators that are located in approximately the same quadrant as the boundary incursion. Therefore if sufficient vortex actuators are positioned around the participant 205, and, simultaneously, multiple predetermined boundaries are positioned around the participant and linked to said multiple vortex actuator, directional feedback may be given to all the sectors around the participant. Therefore, positional and postural feedback, such as that required for balance control may be given to participants without the need for wearable haptic and tactile actuators.

Figure 9:
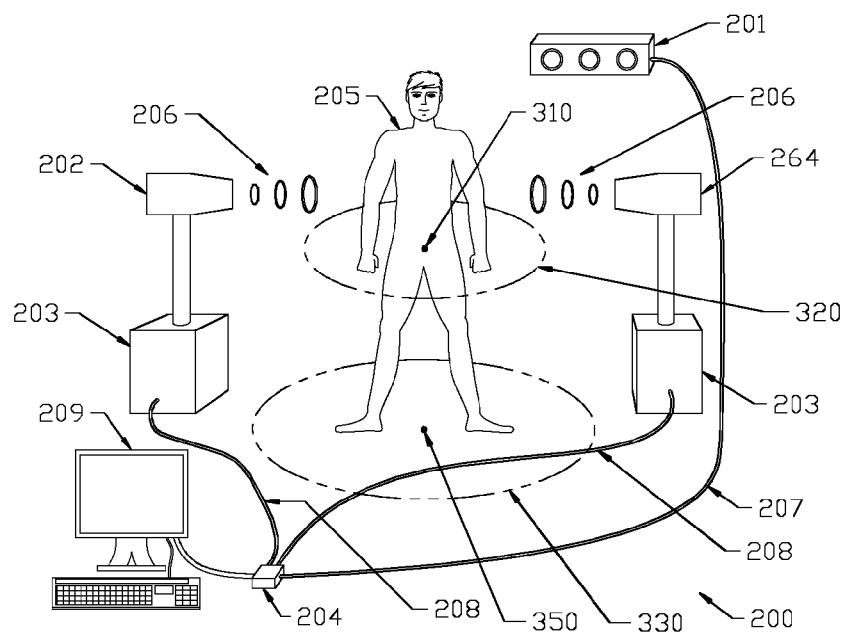
FIG. 9 illustrates an embodiment of a system for tracking one or more participants and providing a remote haptic and tactile feedback stimulus based on an event or participant position.

FIG. 9 shows another alternate embodiment 200 of this invention comprising of one or more 3D camera sensors 201, a controller 204 including means for tracking the position 310 of a participant 205 and a means for providing a remote haptic and tactile feedback stimulus to the participant 205 using one or more vortex ring actuators 202 (and 264). The participant 205 is located within an assigned activity area 330 and is free to move within said activity area. One or more vortex ring actuators 202 (and 264) are usually positioned outside the periphery of the activity area 330. In this embodiment, one or more 3D camera sensors 201 (or other camera based motion sensing/tracking sensor(s)) are used to track the participants 205 orientation and position 310 in the said activity area. The ground projected position 310 corresponds to the location 350 of the participant. The 3D camera sensor 201 signals may be transmitted to a controller 204 using analog or digital means well known in the art. For example a cable 207 may connect said controller 204 to the sensors and associated components using USB, UDP and the like. In other embodiments, wireless transmission may be used. Similarly, the optional motional base units 203 may be connected to the said controller 204 using cables 208. Control signals (including measurement of the motional base unit position and orientation) may therefore be communicated using standard analog or digital interface techniques well known in the art. Further in other embodiments, wireless transmission may be used.

Various methods are known in the art for 3D camera sensing and optical 3D mapping, i.e., generating a 3D profile of the surface of an object by processing an optical image of the object. Some methods are based on projecting a speckle pattern onto the object, and then analyzing an image of the pattern on the object (for example U.S. Pat. No. 7,433,024). These systems reconstruct a 3D map of the object or participant. The term "3D map" refers to a set of 3D coordinates representing the surface of a given object, in this case the participant's body. In other designs, the 3D camera device projects a pattern of spots onto the object and captures an image of the projected pattern, and then computes the 3D coordinates of points on the surface of the participant's body by triangulation, based on transverse shifts of the spots in the pattern. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, 3D cameras may use other methods of 3D mapping, using single or multiple cameras or other types of sensors, as are known in the art. By way of example, the Microsoft Kinect exemplary system provides a low cost 3D camera sensor.

The 3D camera sensor 201 provides an instrument for measuring the orientation and position of a participant 205 who is standing within the field of view (corresponding to the participant activity area 330) of one or more 3D camera sensors. Specifically the 3D camera sensor 201 provides a 3D map or image field to a controller 204. Image processing software on the controller 204 processes the data, identifying one or more participants 205 in the image data field, identifying associated participant body segments (such as the torso or limbs) and tracking their position and orientations. Each segment can have combinations of translational and rotational degrees of freedom (DOFs) relative to a parent segment. The system software automatically constructs the geometric postural skeleton structure, DOF relations, and DOF constraints between segments according to biomechanical principles that are well known in prior-art. Further the software is able to measure the body segment positions as well as the torso of the participant (or coordinates) 205 within the active area. The data processing rate is usually restricted by the framing rate of the 3D camera sensor (for example 30 frames per second); however, this is typically fast enough for real time motional and positional analysis. Therefore, the participant 205 orientation, position and movement with respect to one or more of the 3D camera sensors can be detected and classified by the controller 204.

3D camera sensor 201 will result in a sensor field of view with a defined vertical, horizontal and depth range (this will be determined by the height of the sensor, the design and environment). Typical 3D camera sensors may have reasonable horizontal and vertical accuracy, but will have less precision in depth. Further, areas that are located behind opaque objects in the field of view of the sensor cannot be resolved. Therefore in certain embodiments, it is beneficial to use two or more 3D camera sensors 201 that are located with different, intersecting fields of view, to provide a more accurate and robust calculation of the biomechanical joint positions and angles (or orientation and position) of the participant 205 who is standing within the field of view of the sensor. For example, a 3D camera sensor may be placed on a stand, with another 3D camera sensor located distal to the first, thereby orientating the sensors with different aspects and orientations to the participant. More specifically, 3D camera sensors can be located on a stand, to be off axis, but predominantly facing the participants. Multiple 3D camera sensors should preferably be located orthogonally, approximately 2 m from the participant, thereby utilizing the full usable measurement range of the sensors and providing an accurate measurement of the anterior-posterior (front backwards) as well as medio-lateral (side to side) movement of the participant 205.

In other embodiments of this invention, multiple 3D camera sensors 201 can be used to increase the operation range or measurement capabilities of the system. For example, a series of two or more 3D camera sensors, each communicating to a controller 204, may be positioned approximately 2 m adjacent from each other, on a common axis and facing similar heading. Therefore multiple 3D camera sensors are positioned such that the participant 205 can be measured at all locations in said activity area 330, by at least one 3D camera sensor communicating to a controller 204, thereby increasing the overall measurement range and activity area 330 for this embodiment of the system.

A particular feature of the 3D camera sensor used in this invention is its ability to identify and classify multiple participants (for example, up to 4 participants can be tracked simultaneously). Therefore in other embodiments, the position and orientation of multiple participants can be measured and processed by the controller 204. Further, in embodiments containing multiple vortex ring actuators, a specific vortex ring actuator can track and provide a stimulus to a particular participant. These features allow haptic and tactile stimuli to be delivered to individual specific participants, or simultaneously to multiple participants.

FIG. 9 shows the 3D camera sensor 201, one or more vortex actuators 202 (and 264) and an optional means for controlling the orientation of the vortex actuators using motion base 203 (described hereinbefore). These items communicate with the controller 204 using conventional wired or wireless connections. For example, a 3D camera sensor may communicate directly to the intelligent controller 204 using a wired connection, such as a conventional universal serial bus (USB) connection or the like. The controller 204 determines the participant 205 location 310 based on the 3D camera and body segment software. If the participant 205 moves such that the participant location 310 crosses one or more predetermined boundaries (for example virtual boundaries 320), the controller detects the particular boundary incursion, and what tactile and haptic feedback stimuli should be presented to the participant 205. For example if the boundary 320 is crossed by the participants position 310, the participant 205 may receive haptic and tactile feedback cues from vortex ring actuator 202. Similarly, directional haptic and tactile feedback cues as described hereinbefore may be given by one or more vortex ring actuators positioned corresponding to one or more additional sensor combinations making up one or more additional virtual boundaries.

The optional module 209 provides a representation of a general interface to certain embodiments of the remote haptic system. Participant 205, boundary 320 and task configuration information may be stored on the controller 204. Various sensor inputs (from one or more 3D camera sensors) are processed by the controller 204, including steps of positional scaling, transformation of axes and combination of data from other sensors. Further, the previously described embodiments with multiple participants, and multiple camera sensor, and multiple vortex ring actuator embodiments will require process control procedures that are embedded within the controller. Depending on the application, the controller may also receive input from other systems (for example, in one embodiment, the VR training system).

Figure 10:
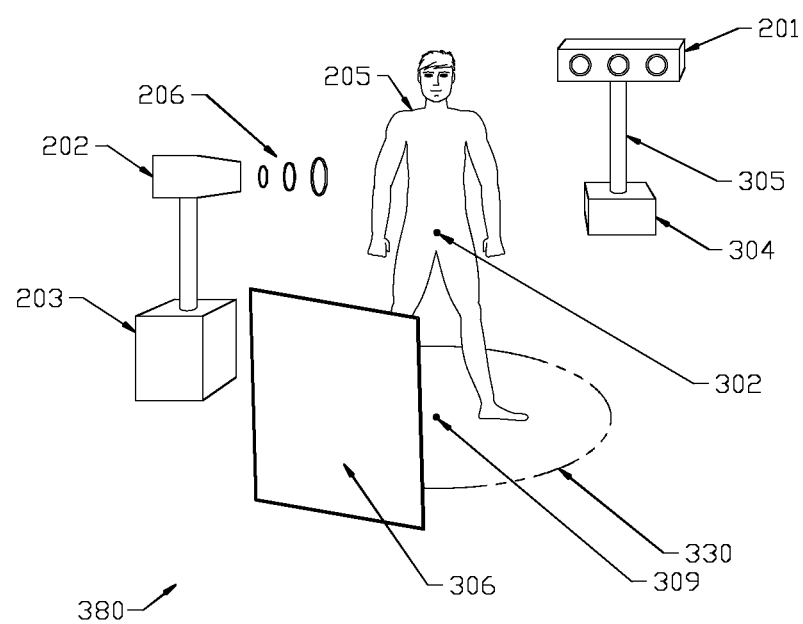
FIG. 10 illustrates an embodiment of a system for tracking one or more participants and providing a remote haptic and tactile feedback stimulus.

FIG. 10 illustrates a view 380 showing other aspects of an embodiment of a system for providing a remote haptic and tactile feedback stimulus based on participant position and/or orientation. In this embodiment, the participant position 302 and orientation is tracked using one or more 3D camera sensors 201. The participant position 302 is typically the participant center of gravity (determined from the 3D camera sensors) which has a ground projected position 309. Alternately, the participant position can be defined by the actual positions of multiple segments such as the torso, limbs and head. A virtual boundary 306 having a position within an activity area 330 is defined as described hereinbefore. This boundary 306 may be a line, surface or closed surface (keep out area) depending on the particular application. A controller (described hereinbefore) receives data from said 3D sensors. If the participant 205 position 302 moves to within a predefined range, or crosses over the boundary 306, the said controller provides the optional motional base 203 control signals, such that the vortex actuator 202 (or 264) is positioned (or aimed) towards one or more participants, and produces one or vortex rings 206 that are directed to impinge on the participant 205, thereby imparting a haptic and tactile stimulus. This system may be used as a warning for persons approaching areas of danger, as a deterrent in a security system, or as a covert communication system (for example, in directed advertising in an effort to attract the attention of a participant).

One or more 3D camera sensors may also be positioned on another optional motional base. For example, motional base 304 (and stand 305) may be used to position the 3D camera sensor (201) in the direction of one or more participants 205. This configuration is advantageous as the effective activity area 330 may be larger in extent compared to a single 3D camera sensor (201) mounted on a fixed stand or support base. It should be noted that in this configuration, the controller will have to use the sensor motional support base real-time position and orientation data, calculate and perform appropriate coordinate transforms to resolve the participant position 302.

Figure 11:
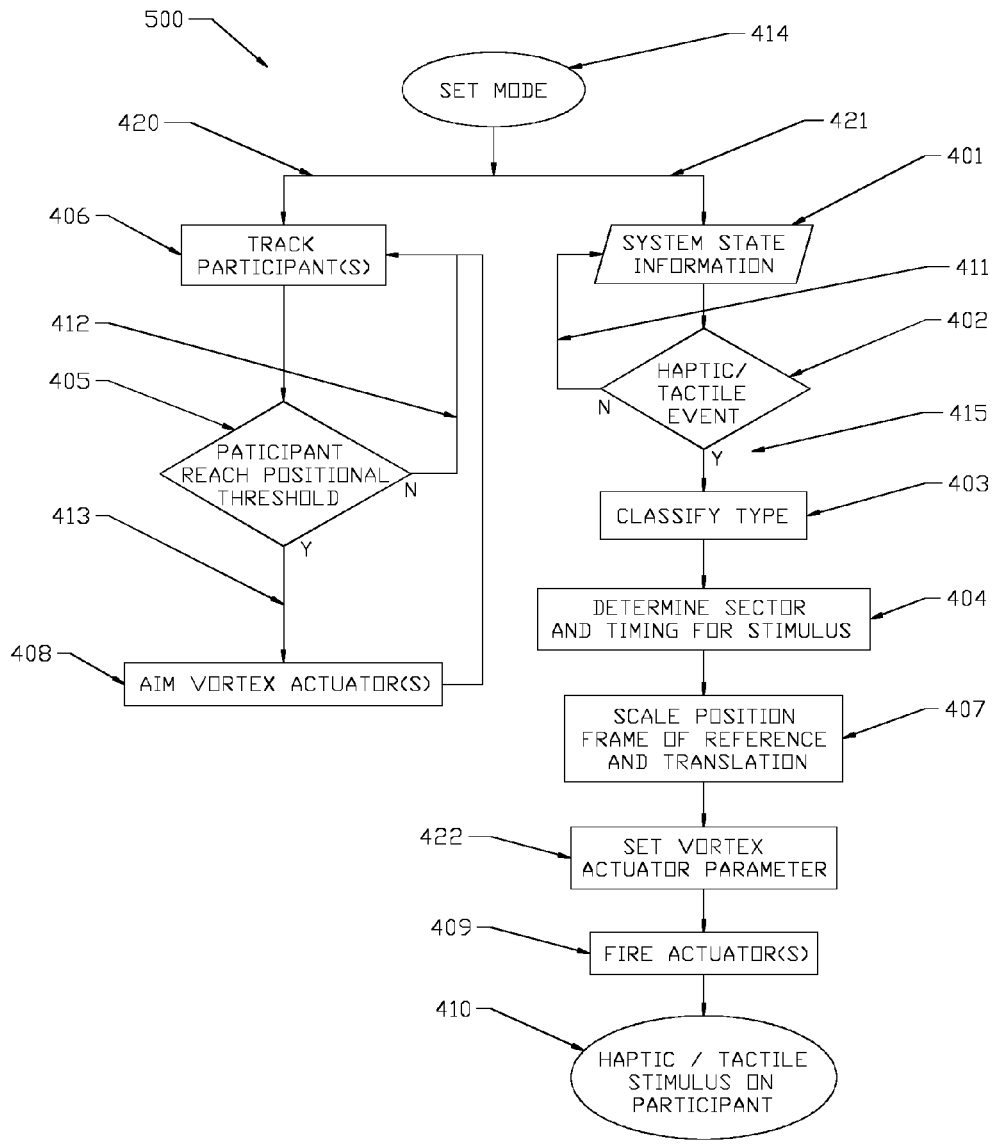
FIG. 11 illustrates a block diagram for an embodiment of a remote vortex feedback system.

FIG. 11 illustrates a logic flow diagram 500 describing an embodiment of a system for providing a remote haptic and tactile feedback stimulus during a virtual reality task. Specifically, the flow diagram describes the interface of the haptic and tactile feedback system with virtual reality training or gaming software in which the participant (or multiple participants) interacts with virtual scenarios according to methodology well known in the art. Not shown in FIGS. 7, 8, 9 and 10 are visual and audio feedback devices that are well known in the art and may be used in virtual reality training or gaming systems and the like. These visual and auditory display systems may include visual domes, extended screens, surround sound, loudspeaker arrays, wearable visual displays, headphones etc.

Said virtual scenarios create events that have haptic and tactile associations, as determined by a model. Said model is used to classify the type, location, and stimuli parameters that must be associated with the haptic and tactile virtual events. One or more haptic and tactile events cause one or more vortex actuators to produce one or more vortex rings. Said actuators are positioned remote from one or more participants who are interacting with said virtual training or gaming systems, within an activity area. Said vortex rings are designed to propagate from said vortex actuators, impinge onto the body surface (or a particular location on the body surface) of said participant(s), thereby creating a haptic and tactile feedback cue that is associated with a simulator event.

The mode 414 determines the intended application and initial configuration information may be input to the system. For example, the "realism" or presence of the intended virtual world, situational and task information may be set for an activity conveyed to the system. Additional system configuration information may include the number and location of vortex ring actuators, the position of said actuators, the range of said actuators, and the range (and initial orientation) of one or more optional motional bases. These conditions make up the initial conditions 421 for the virtual reality task with remote feedback. The mode 414 also sets the initial conditions 420 for the participant tracking module such as the positional thresholds described hereinafter.

The system 500 generally provides two concurrent tasks, the first, set by initial conditions 420, tracks 406 one or more participants, identifying said participant's positional data and comparing 405 said data to a stored positional threshold. The positional threshold is usually determined by the known location of the participant, the known estimated trajectory and size of the vortex ring, and the known current position and orientation of the vortex ring actuator (aim). Generally, the positional threshold is set that if the participant moves such that more than approximately ⅓ of the estimated vortex ring would be miss the participant (at their new location), the vortex actuator should be moved (or aimed) to the participants new location. Therefore, if the said positional threshold is exceeded 413, the vortex actuators are aimed 408 using the participant's current positional location and using a means for physically orientating the vortex actuators, for example using a motional base. If the said positional threshold 405 is not reached 412, the system continues to track one or more participants 406.

In some simple embodiments of the invention, the remote haptic and tactile feedback system may be configured without sensors for tracking one or more participants, and/or vortex ring positioning using one or more optional motional base actuation systems. Such simple embodiments will be configured in mode 414 specifically, initial conditions 420 (for this case) will be set such that the participant tracking module 406 is not executed.

The second concurrent task identifies the system activity state information 401 in an associated virtual reality training or gaming software system. This activity state information may contain details of the intended task as well as the context. For example, a combat simulation task may include events such as nearby explosions, vehicle collisions, gun-fire or debris strikes. Other examples may require virtual navigation where events may include collisions with obstacles. Events may be presented to the participant using existing visual and auditory displays and also communicated to external systems (using techniques well known in the art such as UDP, TCPIP, streaming and the like) such as a system 500 for providing a remote haptic and tactile feedback stimulus during a virtual reality task.

The system state information 401 is tested 402 to see whether it is associated with a haptic and tactile event. If there is no haptic and tactile association to the event 411, the system state information 401 is continuously monitored. If an event is identified 415, the haptic and tactile types are classified 403 using a predetermined model. Classifications may, for example, include single blasts with an amplitude and duration similar to pressure blast waves from an IED explosion, double blasts, bumps, or extended impacts, multiple impacts and "virtual" contacts depending on the event (context, proximity and type). These classifications are also related to previously determined signal configuration parameters that are associated with the vortex actuators and resultant vortex rings. For example, events and classifications may be stored in a look-up-table or database, linking events, haptic and tactile types, and signal configuration parameters.

Specific haptic and tactile stimulus examples may include profiles that replicate impulse forces (see for example, L Matache, T Zecheru, A Rotariu & T Chereches, Experimental Determination Of Blast Waves Parameters Generated By Firing Of Large-Caliber Gun Systems, International Journal of Modern Manufacturing Technologies, ISSN 2067-3604, Vol. II, No. 1/2010, Mott, D. R., Schwer, D. A., Young, T. R., Levine, J., Dionne, J.-P., Makris, A., et al. (2008). Blast-Induced Pressure Fields Beneath a Military Helmet. Bulletin of the American Physical Society, 53-15. San Antonio, and Klingenberg, G., "Gun Muzzle Blast and Flash," Propellants, Explosives, Pyrotechnics, Vol. 14, Issue 2, 1989, pp. 57-68) associated with the shock wave from explosions, bullets, debris strikes, and the like. Other feedback profiles such as force feedback during collisions with obstacles, wind or even interaction with other participants (for example a virtual teammate tapping the shoulder of a participant) are also possible. For example, perceptual phenomena such as "spatial summation" work in favor of the effectiveness of low-energy large-area stimuli on the skin Generally, impulsive haptic stimuli will have temporal and spatial characteristics that resemble their associated physical analog. However, the amplitude of the stimulus may be much lower, allowing safe exposure to the participant.

It is also possible to generate multiple vortex rings with a single vortex actuator to achieve low frequency tactile sensory effects. However, there may be significant flow interaction effects if the vortices mix and interfere. Therefore, the maximum pulse rate is given by the vortex ring propagation velocity together with the dimensional scale of the vortex. Typically a stable sequence of vortex rings can be generated if they are produced at a rate such that they are separated by more than three times the vortex ring diameter. A series of rings will impinge on the target participant and produce a pulsatile or low frequency tactile sensory effect. Similarly, different sensory effects can also be created from multiple adjacent vortex ring actuators. For example, simultaneous or alternating vortex rings impinging on adjacent body areas can create the sensation of movement and dynamic haptic effects.

Therefore, a determination is made of the classification and type of haptic and tactile stimulus that is required to complete feedback of the virtual reality training or gaming event. An associated sector and timing for the stimulus is identified 404 based on the known location of the virtual event, the location of one or more vortex actuators, and may be scaled 407 from simulator coordinates to the known (or estimated) position of the participant. The sector (with respect to the participant) in which the haptic and tactile stimulus is required, is determined and mapped to one or more vortex array actuators (associated with the sector). The timing for the required stimulus is also calculated based on of the timing of the virtual event, the estimated distance of the vortex actuator from the participant and the estimated vortex ring propagation velocity (estimated from the classification of the haptic and tactile type). In simulator and gaming environments haptic events are known a priori, thus the system can (if necessary) calculate the exact timing needed to fire the vortex actuators such that the stimulus is coincident with the actual virtual event. This information may in some embodiments be provided to the vortex actuator positional controller and actuator configuration parameters (settings such as nozzle shape, size, piston displacement, velocity and gas configuration), and is used to set the vortex actuator parameters 422, fire the actuators 409 and result in a haptic and tactile stimulus on the participant 410.

In other embodiments of the system, additional enhanced states 401 may be identified 415 corresponding to visual effects and/or olfactory cues. Said enhanced states may make up enhanced haptic and tactile events and have associated configuration parameters 422 for providing enhanced vortex rings. Said configuration parameters therefore may be provided to vortex actuators (with means for seeding said vortex rings) to produce enhanced vortex rings (as described hereinbefore) that are "seeded" with a concentration of material suitable for representing the event visual or olfactory cue. It should be noted that these enhanced states and event may or may not be linked to vortex rings impinging on the participant (to produce an additional haptic and tactile feedback cue). For example, an aerosol smoke may be generated (using methods and products well known in the art), produce visible "seeded" vortex rings for enhanced simulator visual effects. In other examples, scents and odors may be added using atomization or sprays (well known in prior-art) to fill the nozzle and vortex ring to enhance the virtual environment.

In other embodiments, different types of tactile and haptic effects may be created by an enhanced configurable vortex ring actuator. Therefore enhanced configuration parameters 422 may be provided to said enhanced configurable vortex actuators. For example, geometric adjustment of the nozzle exit aperture diameter will produce vortex rings with different diameters, features and sensory effects. In other examples, geometric adjustment of a variable length nozzle (in an enhanced configurable vortex ring actuator) provides a means for adjusting the actuator stroke length (throw). As described hereinbefore, a particular advantage of this feature is that the actuator L/D ratio can be held at an ideal value to achieve various vortex characteristics and sensory effects.

In one embodiment of this invention, the sensor systems tracks one or more participants, appropriately scaling and translating the sensor data to determine the position and orientation of one or more participants within the activity area. This information is used together with the previously described simulator event and context information to classify the type of haptic and tactile event, configuring one or more vortex actuators, providing an activation signal to said vortex actuator (at a particular time), producing one or more vortex rings directed towards one or more participants and thereby providing a remote haptic and tactile feedback stimulus, to one or more participants, during a virtual reality task.

In another embodiment of this invention, previously described simulator events and context information is used to classify the type of haptic and tactile event, configure one or more static (fixed orientation) vortex actuators, providing an activation signal to said vortex actuator (at a particular time), producing one or more vortex rings directed generally towards one or more participants and thereby providing a remote haptic and tactile feedback stimulus, to one or more participants, during a virtual reality task.

A specific design example for an indoor virtual training system with remote haptic and tactile feedback comprises of the following modules:

One or more vortex ring actuators positioned at various locations in the virtual training space or activity area;

Actuator controller(s) and interface to communicate with simulation software and vortex ring actuators;

Sensor system to track the position and orientation of the target (person);

Software layer and model that detects the state of the simulation, identifies haptic and tactile events, classifies the stimulus and configuration parameters for the actuators and provides an activation signal to the actuators.

In a virtual training example implementations with only a single participant, typically a minimum of 4 vortex actuators are needed (front, back, sides) although some applications (without surround VR) may require fewer actuators. In an example implementation, the range between the actuator and participant is limited to 20 ft. Vortex rings propagate rather slowly compared to a blast shock wave that is at, or greater than, 340 m/s. Thus the auditory stimulus associated with the generation of the vortex may arrive at the participant ahead of the actual impulse stimulus. Primary blast waves and bullets fired at reasonable ranges will have an impulse that occurs prior to the auditory signal. Humans are also able to resolve rather small timing differences between stimuli. Therefore, vortex jets should ideally be quiet—concave nozzle exit and maintaining an ideal L/D ratio of 4 are critical features for silent operation.

Accordingly, the invention may be characterized as a method for providing a remote feedback stimulus to the body of a participant in response to an event, comprising aiming a vortex generator at a participant; generating or detecting an event; and delivering an activation signal to at least one actuator at least some distance from the participant to produce at least one vortex ring directed at the participant to generate a haptic or tactile feedback stimulus to the participant.

Alternatively, the invention may be characterized as a method for controlling one or more vortex actuators to provide a remote stimulus to a participant, comprising providing a controller for receiving and interpreting participant positional and activity state information and selectively producing an activating signal; and transmitting the activating signal to one or more vortex actuators to generate a vortex ring and produce one or more tactile or haptic stimuli to the participant.

Still further, the invention may be characterized as a method for providing a remote feedback stimulus to the body of a participant in response to an event, comprising sensing the position of the participant to generate sensed position information; delivering the sensed position information to a controller; comparing the sensed position information to a predetermined threshold, and generating an activation signal if the sensed position information exceeds the threshold; and delivering the activation signal to at least one actuator at least some distance from the participant to produce at least one vortex ring directed at the participant to generate a haptic or tactile feedback stimulus to the participant.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A method for providing a remote feedback stimulus to the body of a participant in response to a computer simulated event, the method comprising:
   testing system state information of the computer simulated event to identify haptic and tactile association;
   classifying haptic and tactile type of the computer simulated event using a predetermined model if haptic and tactile association is identified;
   sensing the position of the participant to generate sensed position information;
   delivering the sensed position information to a controller;
   comparing the sensed position information to a predetermined threshold, and generating an activation signal if the sensed position information exceeds the threshold; and
   delivering the activation signal to at least one actuator at least some distance from the participant to produce at least one vortex ring directed at the participant to generate a haptic or tactile feedback stimulus to the participant.

2. The method of claim 1 wherein the sensed position information comprises the location of the participant.

3. The method of claim 1 wherein the sensed position information comprises the orientation of the participant.

4. The method of claim 1 wherein the computer simulated event comprises the movement of the participant.

5. The method of claim 1 wherein the at least one actuator tracks the movement of the participant.

6. The method of claim 1 wherein the at least one actuator comprises at least one of a moving coil; a piston; a high energy pneumatic source combined with a unidirectional moving coil; and a spring.

7. The method of claim 1 wherein the at least one actuator comprises at least one of a cylinder with an exit aperture; an exit aperture with an edge; a variable diameter exit aperture; and a variable length nozzle.

8. The method of claim 1 wherein the at least one actuator comprises an enhanced configurable vortex ring actuator.

9. The method of claim 1 wherein the vortex ring is seeded to enhance temperature sensation to the participant.

10. The method of claim 1 wherein the vortex ring is seeded to enhance olfactory sensation to the participant.

11. The method of claim 1 wherein the vortex ring is seeded to enhance visual sensation to the participant.

12. A method for controlling one or more vortex actuators to provide a remote stimulus to a participant in a computer simulated event, the method comprising:
   testing system state information of the computer simulated event to identify haptic and tactile association;
   classifying haptic and tactile type of the computer simulated event using a predetermined model if haptic and tactile association is identified;
   providing a controller for receiving and interpreting participant positional and activity state information and selectively producing an activating signal; and
   transmitting the activating signal to one or more vortex actuators to generate a vortex ring and produce one or more tactile or haptic stimuli to the participant.

13. The method of claim 12 wherein receiving and interpreting participant positional and activity state information comprises sensing the position of the participant to generate sensed position information and delivering the sensed position information to the controller.

14. The method of claim 13 wherein receiving and interpreting participant positional and activity state information comprises comparing the sensed position information to a predetermined threshold, and generating an activating signal if the sensed position information exceeds the threshold.

15. The method of claim 14 wherein receiving and interpreting participant positional and activity state information comprises delivering the activating signal to at least one actuator at least some distance from the participant to produce at least one vortex ring directed at the participant to generate a haptic or tactile feedback stimulus to the participant.

16. A method for providing a remote feedback stimulus to the body of a participant in response to a computer simulated event, the method comprising:
   aiming a vortex generator at a participant;
   testing system state information of the computer simulated event to identify haptic and tactile association;
   classifying haptic and tactile type of the computer simulated event using a predetermined model if haptic and tactile association is identified; and
   delivering an activation signal to at least one actuator at least some distance from the participant to produce at least one vortex ring directed at the participant to generate a haptic or tactile feedback stimulus to the participant.

* * * * *